United States Patent
Fox et al.

(10) Patent No.: US 9,415,857 B2
(45) Date of Patent: Aug. 16, 2016

(54) WING FOLD SYSTEM

(71) Applicant: The Boeing Company, Chicago, IL (US)

(72) Inventors: Stephen John Fox, Everett, WA (US); Seiya Sakurai, Seattle, WA (US); Victor A. Munsen, Woodinville, WA (US); Jack S. Noble, Shoreline, WA (US); John Tony Skomorowski, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 79 days.

(21) Appl. No.: 13/962,952

(22) Filed: Aug. 9, 2013

(65) Prior Publication Data

US 2014/0117151 A1   May 1, 2014

Related U.S. Application Data

(60) Provisional application No. 61/720,320, filed on Oct. 30, 2012.

(51) Int. Cl.
*B64C 3/56* (2006.01)
*B64C 23/06* (2006.01)

(52) U.S. Cl.
CPC ............... *B64C 3/56* (2013.01); *B64C 23/065* (2013.01); *Y02T 50/145* (2013.01); *Y02T 50/164* (2013.01)

(58) Field of Classification Search
CPC .. B64C 23/065; B64C 3/56; B64C 2201/102; B64C 2201/042; B64C 13/28; B64C 2201/028; B64C 23/005; B64C 25/20; B64C 39/10; B64C 3/00; B64C 3/54; B64C 5/06; B64C 9/02; B64C 9/323
USPC ................... 244/46, 49, 199.3, 199.4
See application file for complete search history.

(56) References Cited

U.S. PATENT DOCUMENTS

| 1,718,617 A | 6/1929 | Wagner |
| 1,723,962 A | 8/1929 | Weymouth |
| 2,021,324 A | 11/1935 | Osborn |

(Continued)

FOREIGN PATENT DOCUMENTS

| EP | 1375342 A1 | 1/2004 |
| EP | 0988225 B1 | 10/2006 |

(Continued)

OTHER PUBLICATIONS

Dong, "Adaptive Wing for an Aircraft," U.S. Appl. No. 13/871,296, filed Apr. 26, 2013, 27 pages.

(Continued)

*Primary Examiner* — Brian M O'Hara
*Assistant Examiner* — George Andonyan
(74) *Attorney, Agent, or Firm* — Yee & Associates, P.C.

(57) ABSTRACT

A wing fold system may move a second portion of a wing with respect to a first portion of the wing between flight position 301 and folded position 303. A first link may rotate in response to actuating an actuator. A second link may move in response to rotating of the first link. The second portion of the wing may move in response to moving the second link and the second portion may move with respect to the first portion of the wing. One of the first portion and the second portion may be a fixed portion of the wing and the other of the first portion and the second portion may be a wingtip of the wing.

18 Claims, 14 Drawing Sheets

(56) References Cited

U.S. PATENT DOCUMENTS

| | | | |
|---|---|---|---|
| 2,166,564 A | | 7/1939 | Atwood et al. |
| 2,280,809 A | | 4/1942 | Evans |
| 2,289,224 A | * | 7/1942 | Anderson ................. B64C 3/56 244/49 |
| 2,290,850 A | | 7/1942 | Umschweif |
| 2,375,423 A | * | 5/1945 | Lobelle ..................... B64C 3/54 244/124 |
| 2,392,506 A | | 1/1946 | Rossmann |
| 2,444,332 A | | 6/1948 | Briggs et al. |
| 2,468,425 A | | 4/1949 | Carpenter et al. |
| 2,533,429 A | | 12/1950 | Carpenter |
| 2,674,422 A | | 4/1954 | Pellarini |
| 2,712,421 A | | 7/1955 | Naumann |
| 2,719,682 A | | 10/1955 | Handel |
| 2,876,677 A | | 3/1959 | Clark et al. |
| 3,081,053 A | | 3/1963 | Jarrell |
| 3,556,439 A | | 1/1971 | Autry et al. |
| 4,249,765 A | | 2/1981 | Janssen |
| 4,457,479 A | * | 7/1984 | Daude .......................... 244/203 |
| 4,824,053 A | | 4/1989 | Sarh |
| 5,201,479 A | | 4/1993 | Renzelmann |
| 5,310,138 A | | 5/1994 | Fitzgibbon |
| 5,350,135 A | | 9/1994 | Renzelmann et al. |
| 5,372,336 A | * | 12/1994 | Paez ................................ 244/49 |
| 5,379,969 A | | 1/1995 | Marx et al. |
| 5,381,986 A | | 1/1995 | Smith et al. |
| 5,427,329 A | | 6/1995 | Renzelmann et al. |
| 5,452,643 A | | 9/1995 | Smith et al. |
| 5,492,288 A | | 2/1996 | Bordelon |
| 5,495,999 A | | 3/1996 | Cymara |
| 5,558,299 A | | 9/1996 | Veile |
| 5,593,113 A | | 1/1997 | Cox |
| 5,743,490 A | | 4/1998 | Gillingham et al. |
| 5,988,563 A | | 11/1999 | Allen |
| 6,032,418 A | | 3/2000 | Larson |
| 6,076,766 A | | 6/2000 | Gruensfelder |
| 6,089,502 A | | 7/2000 | Herrick et al. |
| 6,168,113 B1 | | 1/2001 | Hann et al. |
| 6,260,799 B1 | | 7/2001 | Russ |
| 6,273,369 B1 | | 8/2001 | Nishimura |
| 6,446,906 B1 | | 9/2002 | Voigt et al. |
| 6,834,835 B1 | | 12/2004 | Knowles et al. |
| 7,275,722 B2 | | 10/2007 | Irving et al. |
| 7,445,180 B2 | | 11/2008 | Plude et al. |
| 7,637,454 B2 | | 12/2009 | Pitt |
| 7,744,038 B2 | | 6/2010 | Sankrithi et al. |
| 8,157,206 B2 | | 4/2012 | Gionta et al. |
| 8,342,447 B2 | | 1/2013 | Etling |
| 2007/0057120 A1 | | 3/2007 | McConnell |
| 2009/0045288 A1 | | 2/2009 | Nakamura |
| 2009/0302151 A1 | | 12/2009 | Holmes |
| 2010/0084516 A1 | | 4/2010 | Eberhardt |
| 2011/0001016 A1 | | 1/2011 | Skillen et al. |
| 2011/0180657 A1 | | 7/2011 | Gionta et al. |
| 2012/0032023 A1 | | 2/2012 | Bousfield et al. |
| 2012/0085858 A1 | | 4/2012 | Seifert |
| 2012/0228424 A1 | | 9/2012 | Parker |
| 2013/0099060 A1 | | 4/2013 | Dees et al. |
| 2013/0146716 A1 | * | 6/2013 | Gettinger .............. B64C 39/024 244/215 |
| 2013/0327883 A1 | * | 12/2013 | Kordel ...................... B64C 3/56 244/49 |
| 2016/0083074 A1 | | 3/2016 | Santini et al. |

FOREIGN PATENT DOCUMENTS

| | | |
|---|---|---|
| EP | 2650212 A1 | 10/2010 |
| GB | 481050 A | 3/1938 |
| GB | 773739 A | 7/1955 |

OTHER PUBLICATIONS

Fox, "Fold Wing Tip Having Stub Spar," U.S. Appl. No. 13/251,216, filed Oct. 1, 2011, 16 pages.

Good et al., "Wing Hinge Assembly Including Hinged Torque Boxes," U.S. Appl. No. 13/664,371, filed Oct. 30, 2012, 20 pages.

Kordel et al., "Latching Apparatus and Methods," U.S. Appl. No. 13/493,688, filed Jun. 11, 2012, 38 pages.

Young et al., "Aircraft Excrescence Drag," North Atlantic Treaty Organization Advisory Group for Aerospace Research and Development AGARD-AG-264, Jul. 1981, 172 pages.

"Folding wing," Wikipedia Foundation, Inc., dated Jun. 2, 2013, 5 pages. Accessed Jul. 29, 2013, http://en.wikipedia.org/wiki/Folding_wing.

Santini et al., "Horizontal Folding Wingtip," U.S. Appl. No. 13/964,072, filed Aug. 10, 2013, 63 pages.

Fox et al., "Wing Fold System Rotating Latch," U.S. Appl. No. 13/966,754, filed Aug. 14, 2013, 90 pages.

Lassen et al., "Wing Fold Controller," U.S. Appl. No. 14/022,622, filed Sep. 10, 2013, 61 pages.

Good et al., "Wing Fold System Two Fail Safe Latch Pins Through Multiple Mating Lugs," U.S. Appl. No. 14/049,425, filed Oct. 9, 2013, 80 pages.

Notice of Allowance, dated Nov. 12, 2015, regarding U.S. Appl. No. 14/022,622, 15 pages.

Office Action, dated Jul. 20, 2015, regarding U.S. Appl. No. 14/022,622, 23 pages.

Notice of Allowance, dated Aug. 6, 2015, regarding U.S. Appl. No. 14/049,425, 20 pages.

Notice of Allowance, dated Jul. 24, 2015, regarding U.S. Appl. No. 13/964,072, 17 pages.

Office Action, dated Sep. 23, 2015, regarding U.S. Appl. No. 13/966,754, 16 pages.

Extended European Search Report, dated Jul. 21, 2015, regarding Application No. EP13190093.8, 6 pages.

Extended European Search Report, dated Jul. 24, 2015, regarding Application No. EP13189910.6, 6 pages.

Extended European Search Report, dated Jul. 24, 2015, regarding Application No. EP13190099.5, 5 pages.

Extended European Search Report, dated Jul. 27, 2015, regarding Application No. EP13189962.7, 7 pages.

Canadian Intellectual Property Office Examination Search Report, dated Aug. 3, 2015, regarding Application No. 2,825,073, 4 pages.

Canadian Intellectual Property Office Examination Search Report, dated Aug. 13, 2015, regarding Application No. 2,824,727, 4 pages.

Final Office Action, dated Feb. 10, 2016, regarding U.S. Appl. No. 13/966,754, 35 pages.

Office Action, dated Feb. 8, 2016, regarding U.S. Appl. No. 14/335,625, 38 pages.

* cited by examiner

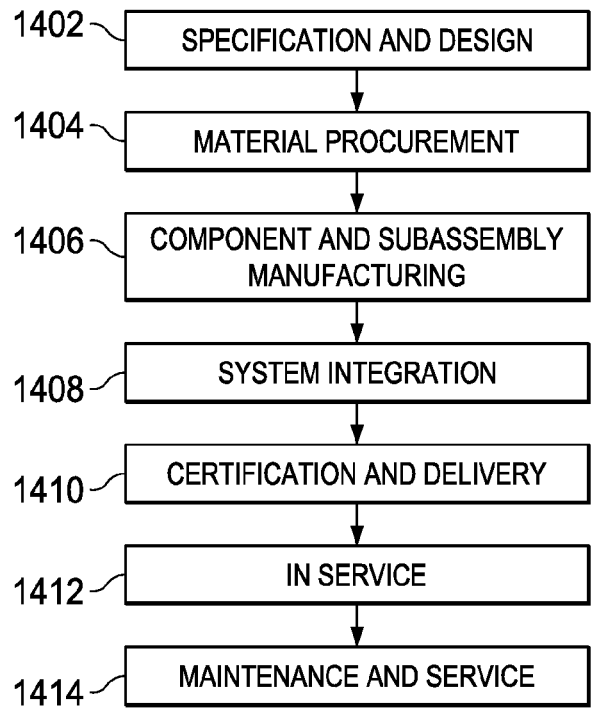
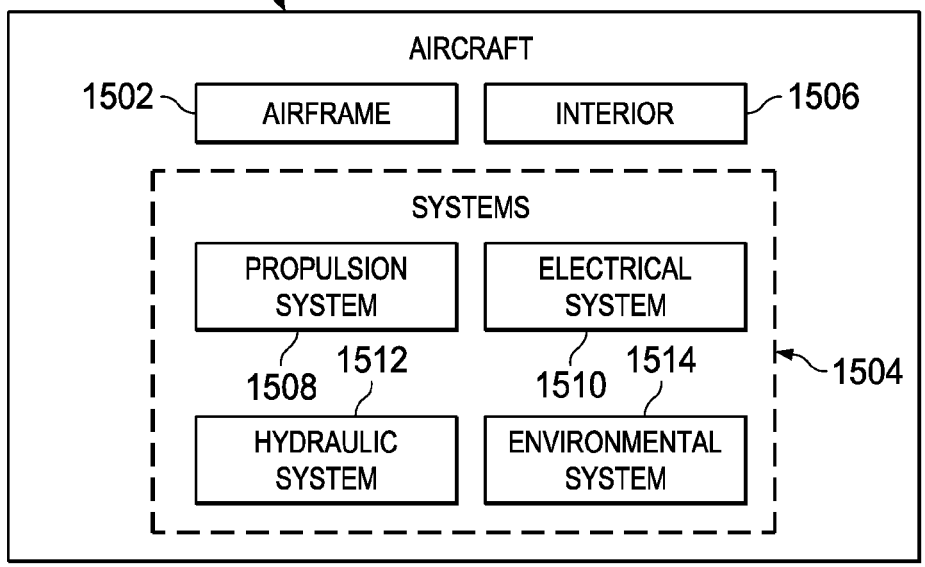

WING FOLD SYSTEM

CROSS REFERENCE AND PRIORITY

This application claims priority to Provisional U.S. Patent Application No. 61/720,320, filed Oct. 30, 2012; disclosure of which is incorporated herein by reference in its entirety.

BACKGROUND INFORMATION

1. Field

This disclosure relates to systems and methods for providing wings, and more specifically, to systems and methods for providing wings to enhance aircraft performance.

2. Background

In today's commercial transport industry, it may be highly desirable to design aircraft configurations that may yield reduced fuel burn per seat-mile, as fuel burn per seat-mile may be a metric of fuel efficiency. Efficient aircraft configurations may be ever more important as fuel costs continue to increase. Aircraft aerodynamic drag and fuel burn may be generally reduced as the aspect ratio of the aircraft wing increases. Similarly, operating larger aircraft, carrying more passengers and payload may generally be more efficient between two destinations than flying several trips with smaller aircraft. Thus larger aircraft and aircraft with longer wing spans tend to be more efficient. However, taxiway spacing and gate locations for most airports were established without providing adequate spacing for aircraft with the longer wingspans that can be produced with today's technology.

Thus, it may be necessary to provide an aircraft that can benefit from a long wing span in flight, while being able to reduce the wing span while operating at an airport.

SUMMARY

The illustrative embodiments provide for a method of folding a wing that may move a second portion of a wing with respect to a first portion of the wing between a flight position and a folded position. An operation of the method may actuate an actuator. Another operation may rotate, in response to the actuating of the actuator, a first link. Another operation may move, in response to the rotating of the first link, a second link. Another operation may move, in response to the moving of the second link, a second portion of a wing with respect to a first portion of the wing. One of the first portion and the second portion may be a fixed portion of the wing and the other of the first portion and the second portion may be a wingtip of the wing.

The illustrative embodiments provide for an apparatus of a wing fold system that may include an actuator, a first link, and a second link. The first link may be configured to rotate in response to actuating of the actuator. The second link may be configured to move in response to rotating of the first link. A second portion of a wing may be configured to move in response to moving of the second link and the second portion may move with respect to a first portion of the wing, wherein one of the first portion and the second portion may be a fixed portion of the wing and the other of the first portion and the second portion may be a wingtip of the wing.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments may be set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 14 is an illustration of an aircraft manufacturing and service method in accordance with an illustrative embodiment; and FIG. 15 is an illustration of an aircraft in which an illustrative embodiment may be implemented.

DETAILED DESCRIPTION

Winglets extending vertically from aircraft wingtips have improved aircraft fuel efficiency without significantly increasing wing span. However, efficiency added by winglets may not be as beneficial as that provided by extending the wing span. Some military aircraft may fold wingtips up, but current wing fold technology may produce weight, drag, reliability, or maintenance access penalties that are not efficient or desirable, and may lack desirable redundancy features.

Figure 1:
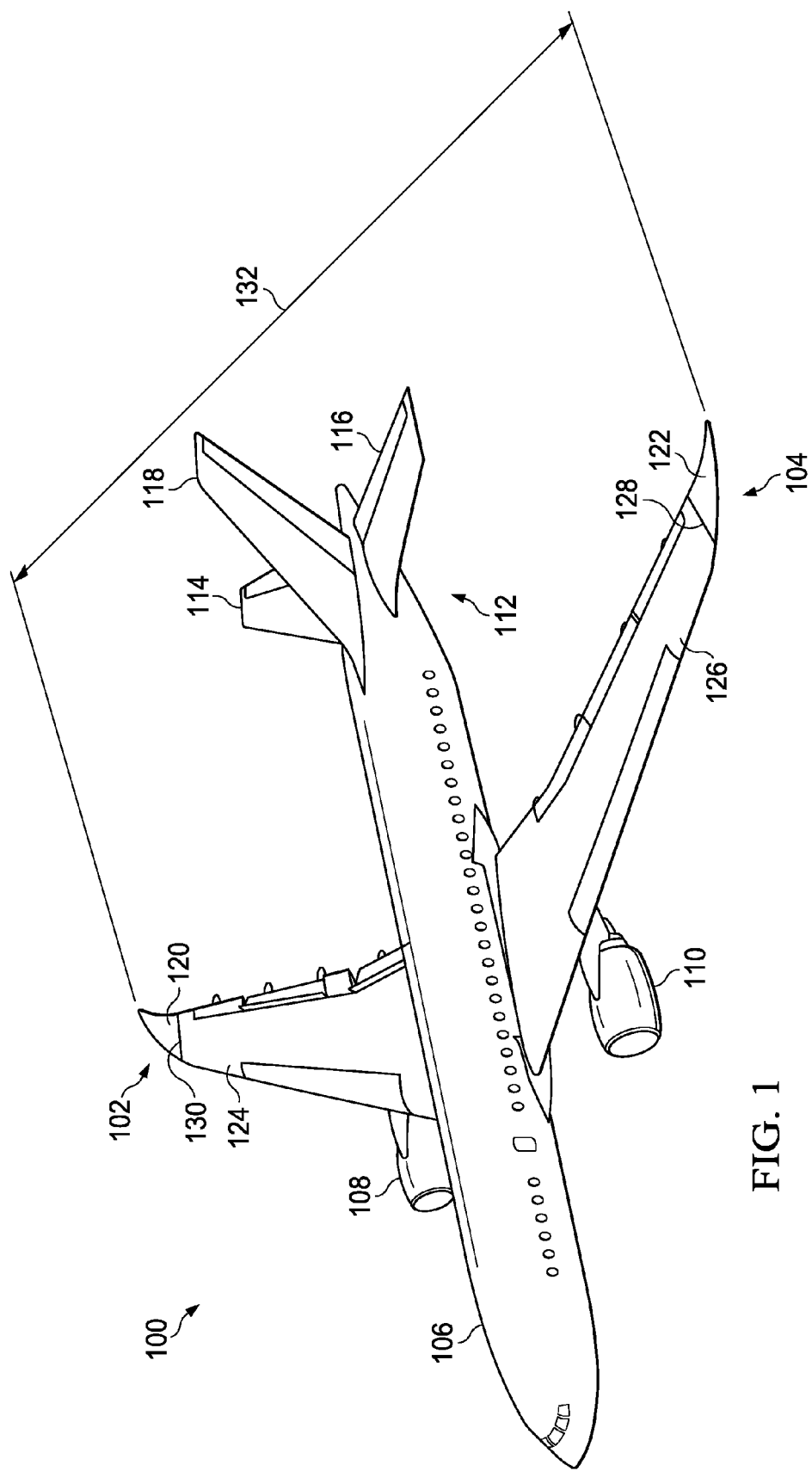
FIG. 1 is a diagram of an aircraft embodying a wing fold system in a flight position in accordance with an illustrative embodiment.
Figure 2:
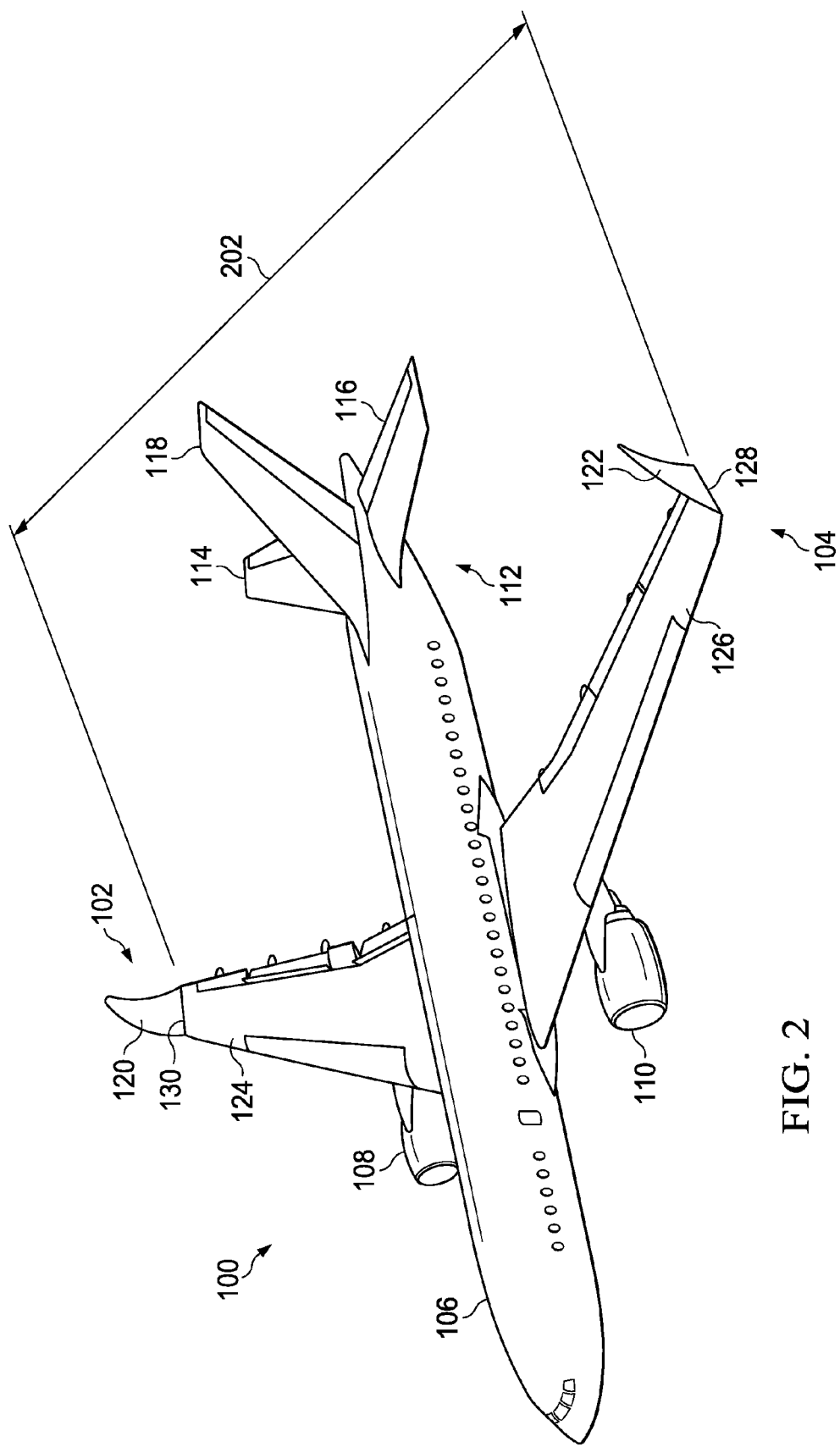
FIG. 2 is a diagram of an aircraft embodying a wing fold system in a folded position in accordance with an illustrative embodiment.

Unless otherwise noted and where appropriate, similarly named features and elements of illustrative embodiments of one figure of the disclosure correspond to and embody similarly named features and elements of embodiments of the other figures of the disclosure. With reference now to the figures, and in particular, with reference to FIGS. 1 and 2, an illustration of an aircraft is depicted in accordance with an illustrative embodiment. Aircraft 100 may be an example of an aircraft in which a wing fold system may be implemented in accordance with an illustrative embodiment. In this illustrative example, aircraft 100 may include wing 102 and wing 104 attached to body 106; engine 108 attached to wing 102; and engine 110 attached to wing 104. FIG. 1 depicts wings 102 and 104 of aircraft 100 in flight position 301 of FIG. 3 and FIG. 2 depicts wings 102 and 104 of aircraft 100 in folded position 303 of FIG. 3.

Wing 102 may include a fixed portion 124 and an unfixed portion 120. Fixed portion 124 may be an inboard portion of the wing fixed to body 106. Similarly, wing 104 may include a fixed portion 126 and an unfixed portion 122. Wing 102 may include wing fold system 130 that may move unfixed portion 120 with respect to fixed portion 124. Wing 104 may include wing fold system 128 that may move unfixed portion 122 with respect to fixed portion 126. FIG. 1 shows wing fold system 128 and 130 of aircraft 100 in flight position 301, with wingspan 132 such that aircraft 100 may be ready for flight. FIG. 2 shows wingspan 202, reduced from wingspan 132, for operation at an airport.

Body 106 may connect to tail section 112. Horizontal stabilizer 114, horizontal stabilizer 116, and vertical stabilizer 118 may be attached to tail section 112 of body 106.

Figure 3:
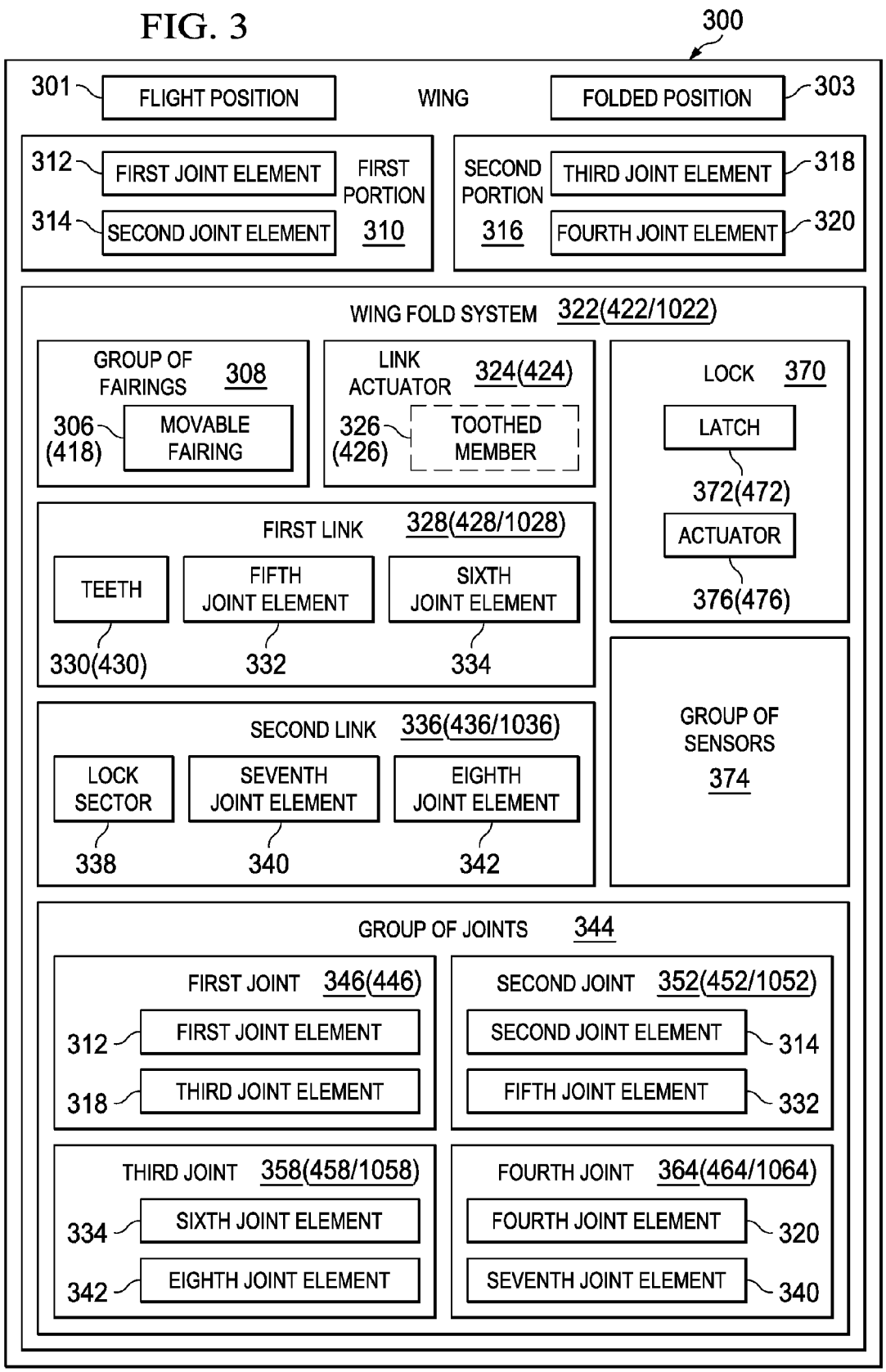
FIG. 3 is a block diagram of a wing with a wing fold system in accordance with an illustrative embodiment.

With reference to FIG. 3, FIG. 3 is a block diagram of a wing with a wing fold system in accordance with an illustrative embodiment. Wing 300 may be an example of a physical embodiment of wing 102 and/or wing 104 in FIG. 1. Wing 300 may provide lift for aircraft 100 in FIG. 1. Wing 300 may include first portion 310, second portion 316, and wing fold system 322. Wing 300 may be positioned in flight position 301. Flight position 301 is depicted with wingspan 132 in FIG. 1.

Folded position 303 wingspan 202 depicted in FIG. 2. Wing 300 may be positioned in folded position 303. Folding wing 300 while operating at an airport, may allow for aircraft 100 to be flown with wingspan 132 that may be longer than wingspan 202 allowed for ground operations at an airport from which the aircraft may be used.

First portion 310 of wing 300 may include first joint element 312 and second joint element 314. Second portion 316 of wing 300 may include third joint element 318 and fourth joint element 320. First portion 310 may be one of: a fixed portion and an unfixed portion of wing 300. Unfixed portion of wing 300 may be a wingtip. Second portion 316 may be the other of: the fixed portion and the unfixed portion of a wing, as compared to first portion 310. For example, when first portion 310 may be an illustrative embodiment of fixed portion 124 of wing 102, then second portion 316 may be an illustrative embodiment of unfixed portion 120 of wing 102 of FIG. 1. As another example, when first portion 310 may be an illustrative embodiment of unfixed portion 120 of wing 102, then second portion 316 may be an illustrative embodiment of fixed portion 124 of wing 102.

Wing fold system 322 may include the components for moving first portion 310 of wing 300 with respect to the second portion 316 of wing 300. Wing fold system 322 may include group of fairings 308, link actuator 324, first link 328, second link 336, group of joints 344, lock 370, and group of sensors 374.

Figure 4:
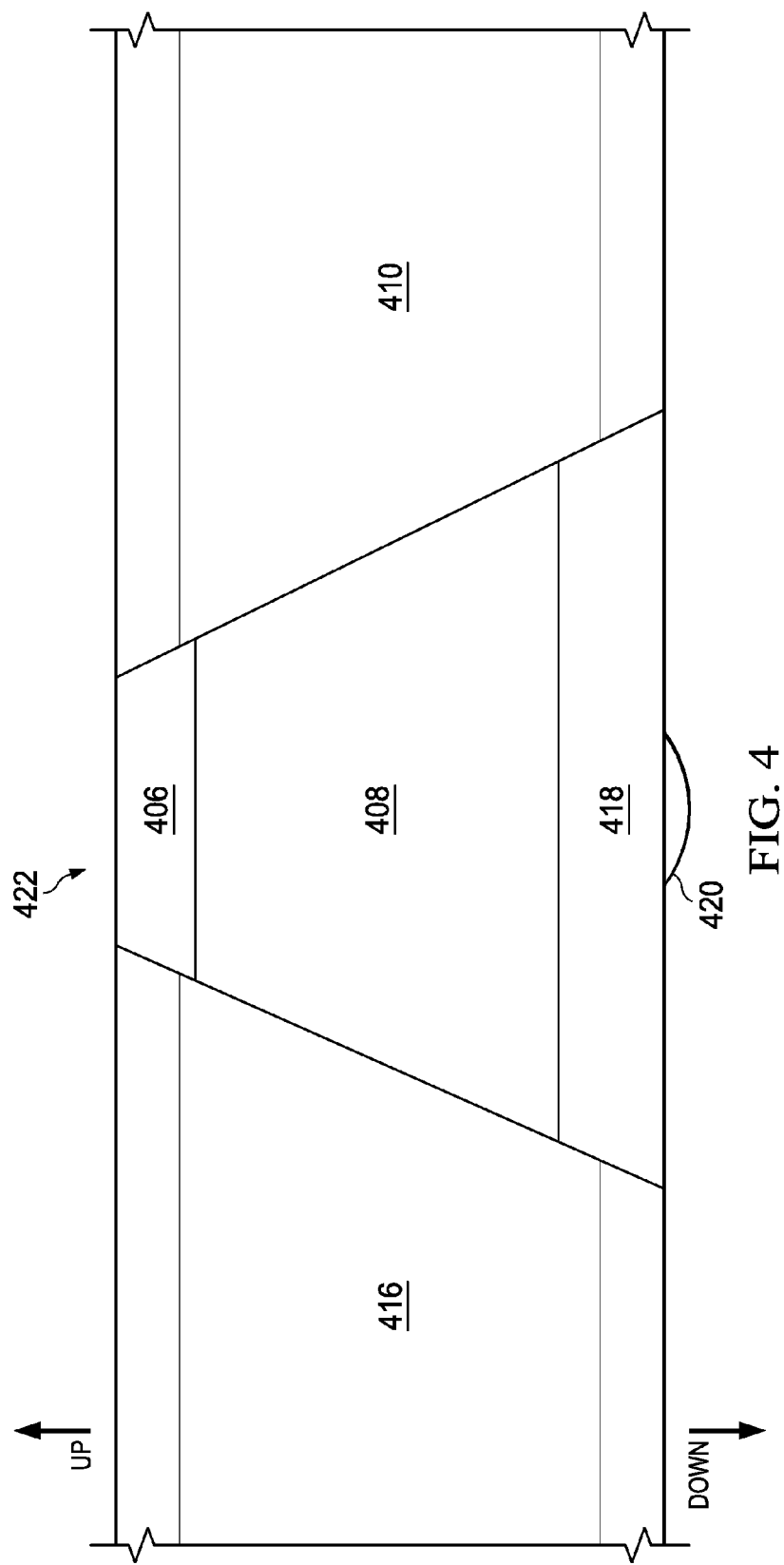
FIG. 4 is a side view diagram of a wing fold system in a flight position in accordance with an illustrative embodiment.

Group of fairings 308 may surround wing fold system 322 when wing fold system 322 may be in flight position 301. Wing 300 in flight position 301 is depicted in FIGS. 1 and 4.

Group of fairings 308 may reduce the drag that would be caused by wing fold system 322 if it were exposed. Moveable fairing 306 of group of fairings 308 may move in response to wing fold system 322 transitioning between flight position 301 and folded position 303. Moveable fairing 306 and group of fairings 308 may be made of sufficiently strong material or a combination of material, including rubber, fiberglass, reinforced plastics, and/or and carbon fiber, and including metals such as steel, aluminum, and titanium. As used herein, the phrase "group of" means "one or more of" such that a group of fairings may be one or more fairings.

Group of sensors 374 may sense positioning of at least one of second portion 316, first link 328, second link 336, and lock 370. Group of sensors 374 may sense operation of at least one of second portion 316, first link 328, second link 336, and lock 370. Data and information from a sensor in group of sensors 374 may be used to determine if the aircraft may be ready for flight. A sensor in group of sensors 374 may sense a position or a condition of lock 370.

Group of joints 344 may allow for movement and rotation of first portion 310 and second portion 316 via first link 328 and second link 336. Group of joints 344 may include first joint 346, second joint 352, third joint 358, and fourth joint 364.

First joint 346 may include first joint element 312 of first portion 310 of wing 300 and third joint element 318 of second portion 316 of wing 300. First joint 346 may provide for rotation of second portion 316 with respect to first portion 310 of wing 300. As further illustrated in the embodiment shown at least in FIG. 7, first joint element 312 may be an element of first portion 310, which may be a fixed portion of a wing, that forms a first opening in first portion 310 that may allow first portion 310 to engage with and/or form at least a part of first joint 346. As further illustrated in the embodiment shown at least in FIG. 7, third joint element 318 may be an element of second portion 316, which may be an unfixed portion of the wing, that forms a first opening in second portion 316 that may allow second portion 316 to engage with and/or form at least a part of first joint 346.

Second joint 352 may include second joint element 314 of first portion 310 of wing 300 and fifth joint element 332 of first link 328. Second joint 352 may provide for rotation of first link 328 with respect to first portion 310 of wing 300. As further illustrated in the embodiment shown at least in FIG. 7, second joint element 314 may be an element of first portion 310, which may be a fixed portion of a wing, that forms a second opening in first portion 310 that may allow first portion 310 to engage with and/or form at least a part of second joint 352. As further illustrated in the embodiment shown at least in FIG. 7, fifth joint element 332 may be an element of first link 328 that forms a first opening in first link 328 that may allow first link 328 to engage with and/or form at least a part of second joint 352.

Third joint 358 may include sixth joint element 334 of first link 328 and eighth joint element 342 of second link 336. Third joint 358 may provide for rotation of second link 336 with respect to first link 328. As further illustrated in the embodiment shown at least in FIG. 7, sixth joint element 334 may be an element of first link 328 that forms a second opening in first link 328 that may allow first link 328 to engage with and/or form at least a part of third joint 358. As further illustrated in the embodiment shown at least in FIG. 7, eighth joint element 342 may be an element of second link 336 that forms a first opening in second link 336 that may allow second link 336 to engage with and/or form at least a part of third joint 358.

Fourth joint 364 may include fourth joint element 320 of second portion 316 of wing 300 and may include seventh joint element 340 of second link 336. Fourth joint 364 may provide for rotation of second portion 316 of wing 300 with respect to second link 336. As further illustrated in the embodiment shown at least in FIG. 7, fourth joint element 320 may be an element of second portion 316, which may be an unfixed portion of the wing, that forms a second opening in second portion 316 that may allow second portion 316 to engage with and/or form at least a part of fourth joint 364. As further illustrated in the embodiment shown at least in FIG. 7, seventh joint element 340 may be an element of second link 336 that forms a second opening in second link 336 that may allow second link 336 to engage with and/or form at least a part of fourth joint 364.

Link actuator 324 may actuate first link 328, which may transition first portion 310 and second portion 316 between flight position 301 and folded position 303. Link actuator 324 optionally may include toothed member 326. Link actuator 324 may be hydraulic, pneumatic, or electrical.

Toothed member 326 may be embodied as toothed member 426 of FIGS. 5 through 9. Link actuator 324 may drive toothed member 326 to rotate about a central axis of the toothed member 326. Additionally, toothed member 326 may be embodied as toothed rack 1026 of FIGS. 10 through 12 that may move linearly when actuated by link actuator 324. Toothed member 326 may drive first link 328, which may operate a folding and an unfolding of wing 300. Toothed member 326 may be made of sufficiently strong material or combination of material, including metals such as steel, aluminum, and titanium, and including reinforced plastics and carbon fiber.

First link 328 may compress and may drive wing fold system 322 to move first portion 310 and second portion 316 with respect to each other. First link 328 may include: teeth 330, fifth joint element 332, and sixth joint element 334. Teeth 330 of first link 328 may fit with toothed member 326, which may allow toothed member 326 to drive first link 328. Fifth joint element 332 may be connected with second joint element 314 of first portion 310 via second joint 352. Sixth joint element 334 may be connected to eighth joint element 342 of second link 336 via third joint 358. First link 328 may be made of sufficiently strong material or combination of material, including metals such as steel, aluminum, and titanium, and including reinforced plastics and carbon fiber.

Second link 336 may maintain tension on mechanical components. Second link 336 may include: lock sector 338, seventh joint element 340, and eighth joint element 342. Lock sector 338 may allow for locking the wing in flight position 301 to prevent rotation of an unfixed portion of wing 300 relative to a fixed portion or root of wing 300 during flight of the aircraft. Unfixed portion of wing 300 may be a wingtip. Seventh joint element 340 may be connected to fourth joint element 320 of second portion 316 of wing 300. Eighth joint element 342 may be connected to sixth joint element 334 of first link 328. Second link 336 may be made of sufficiently strong material or combination of material, including metals such as steel, aluminum, and titanium, and including reinforced plastics and carbon fiber.

Lock 370 may prevent movement of first link 328 and second link 336 that may be not in response to link actuator 324. Lock 370 may include latch 372 that may fit into a lock sector of a link. Lock 370 may include actuator 376 that may engage lock 370, for example, by engaging latch 372 with lock sector 338.

The illustration of wing 300 in FIG. 3 is not meant to imply physical or architectural limitations to the manner in which an illustrative embodiment may be implemented. Other components in addition to or in place of the ones illustrated may be used. Some components may be unnecessary. Also, the blocks may be presented to illustrate some functional components. One or more of these blocks may be combined, divided, or combined and divided into different blocks when implemented in an illustrative embodiment. Alternative examples may have links, joints, and locks in addition to those described and still be within the scope of one or more illustrative embodiments.

With reference to FIGS. 4 through 9, illustrations of a wing fold system are depicted in accordance with an illustrative embodiment. Wing fold system 422 may be used by aircraft 100 of FIGS. 1 and 2 and embody wing fold system 322 shown in block form in FIG. 3. As a convenience to the reader, where helpful, elements of FIGS. 4-9 that are associated, as illustrative embodiments, with elements introduced in the block diagram of FIG. 3 are included as parenthetical associations of the 3xx series items with the 4xx items in FIGS. 7-9.

FIG. 4 is a side view diagram of a wing fold system in a flight position in accordance with an illustrative embodiment. More specifically, FIG. 4 depicts a side view diagram of wing fold system 422 in flight position 301 shown in block form in FIG. 3. Flight position 301 is depicted in FIG. 1.

Figure 5:
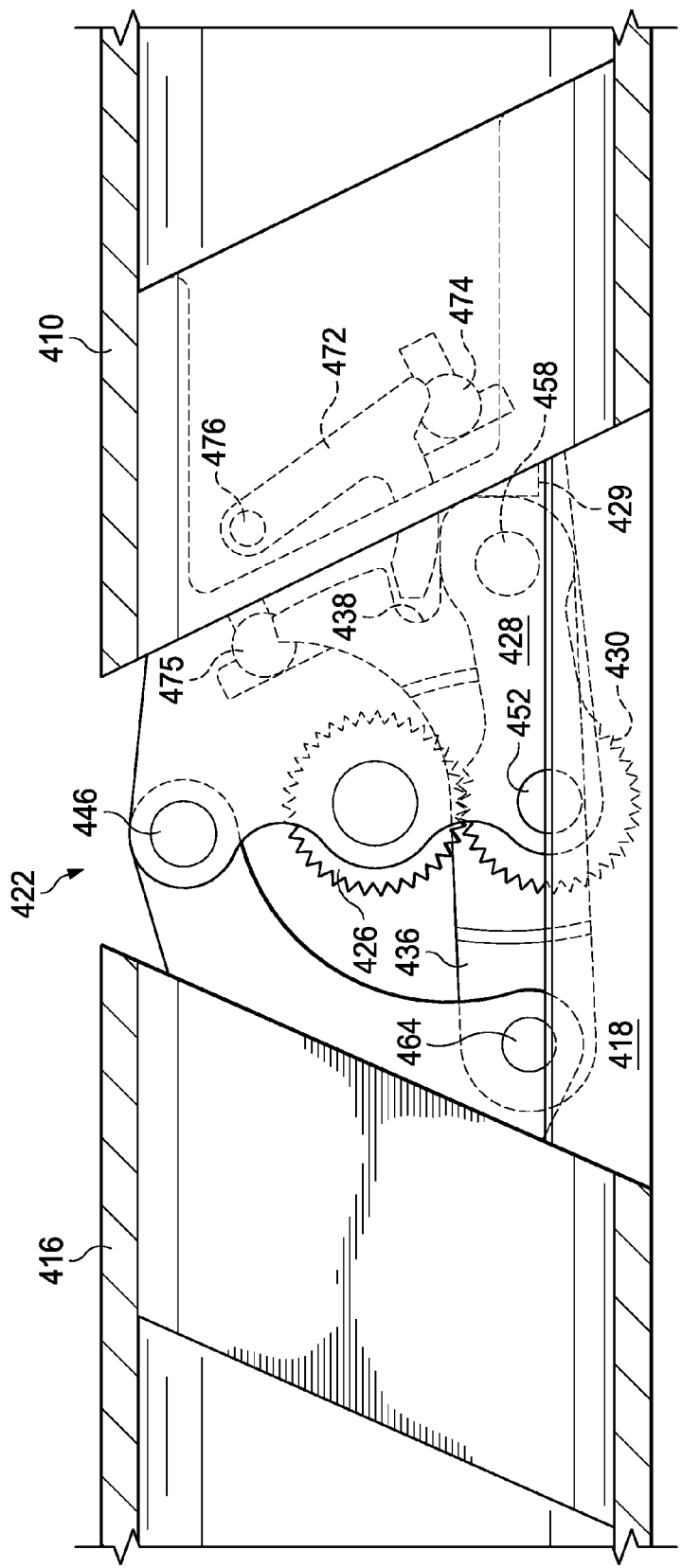
FIG. 5 is a side view diagram of a wing fold system in a flight position in accordance with an illustrative embodiment.
Figure 6:
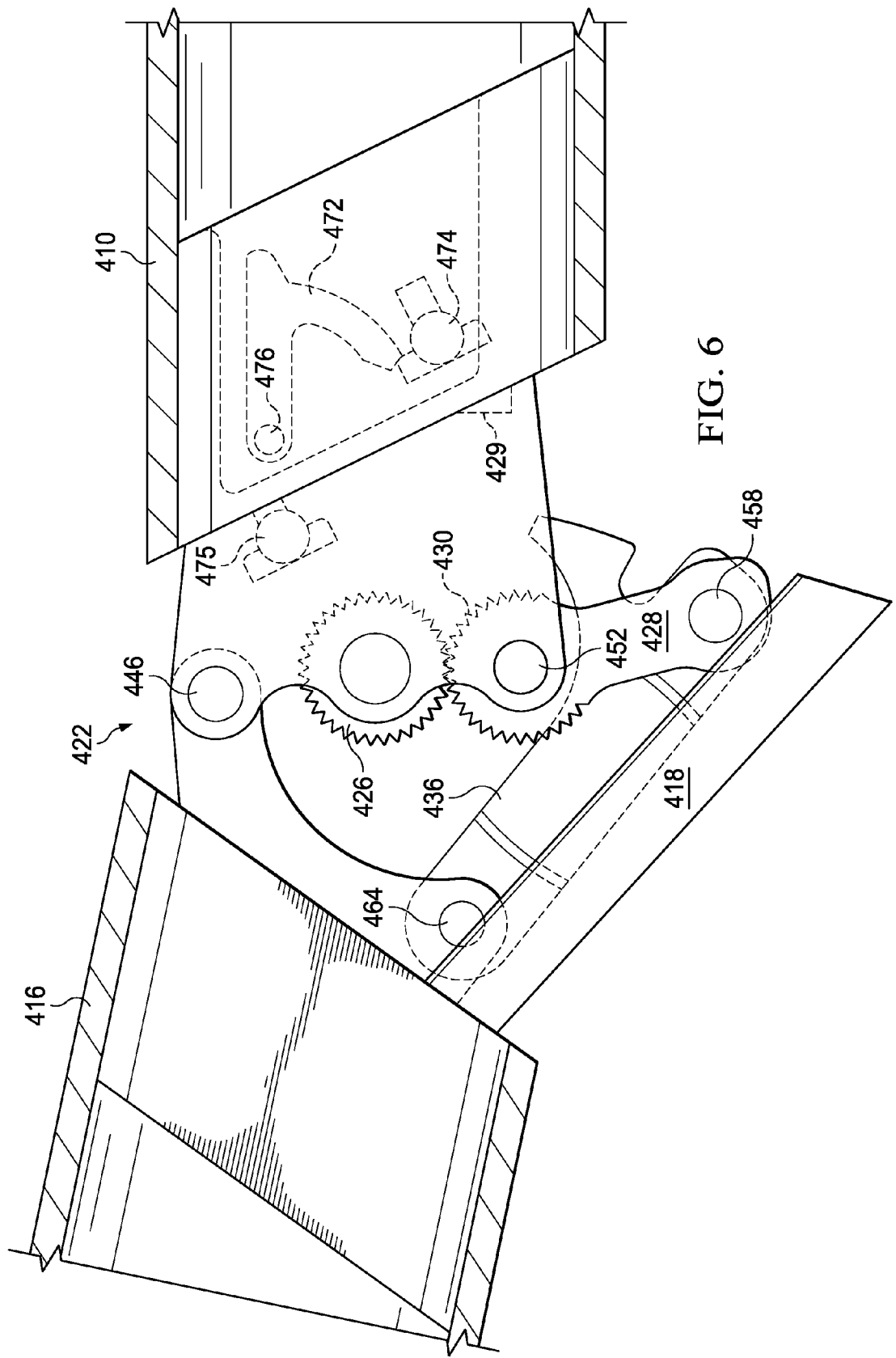
FIG. 6 is a side view diagram of a wing fold system transitioning between a flight position and a folded position in accordance with an illustrative embodiment.
Figure 7:
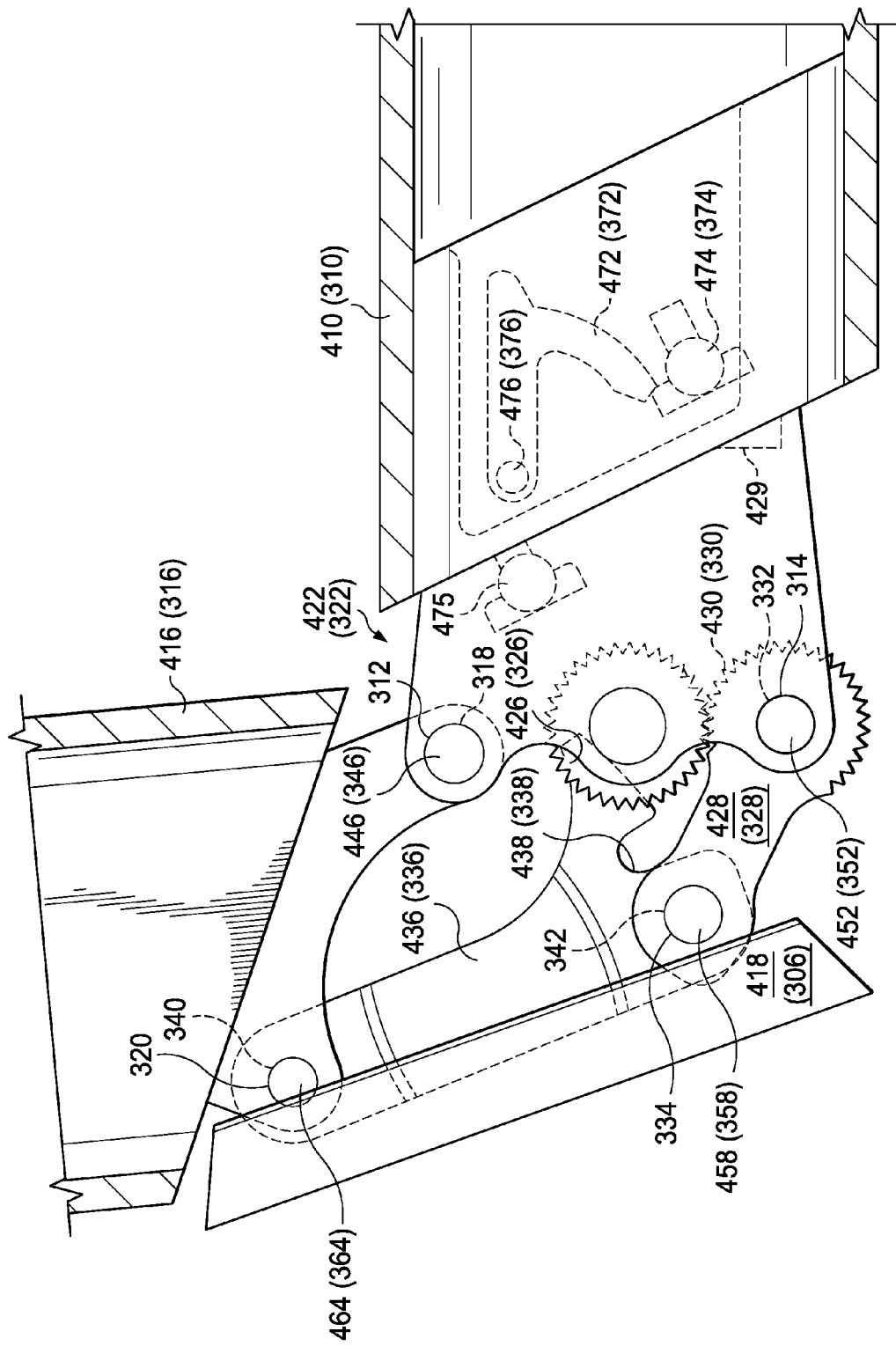
FIG. 7 is a side view diagram of a wing fold system in a folded position in accordance with an illustrative embodiment.
Figure 8:
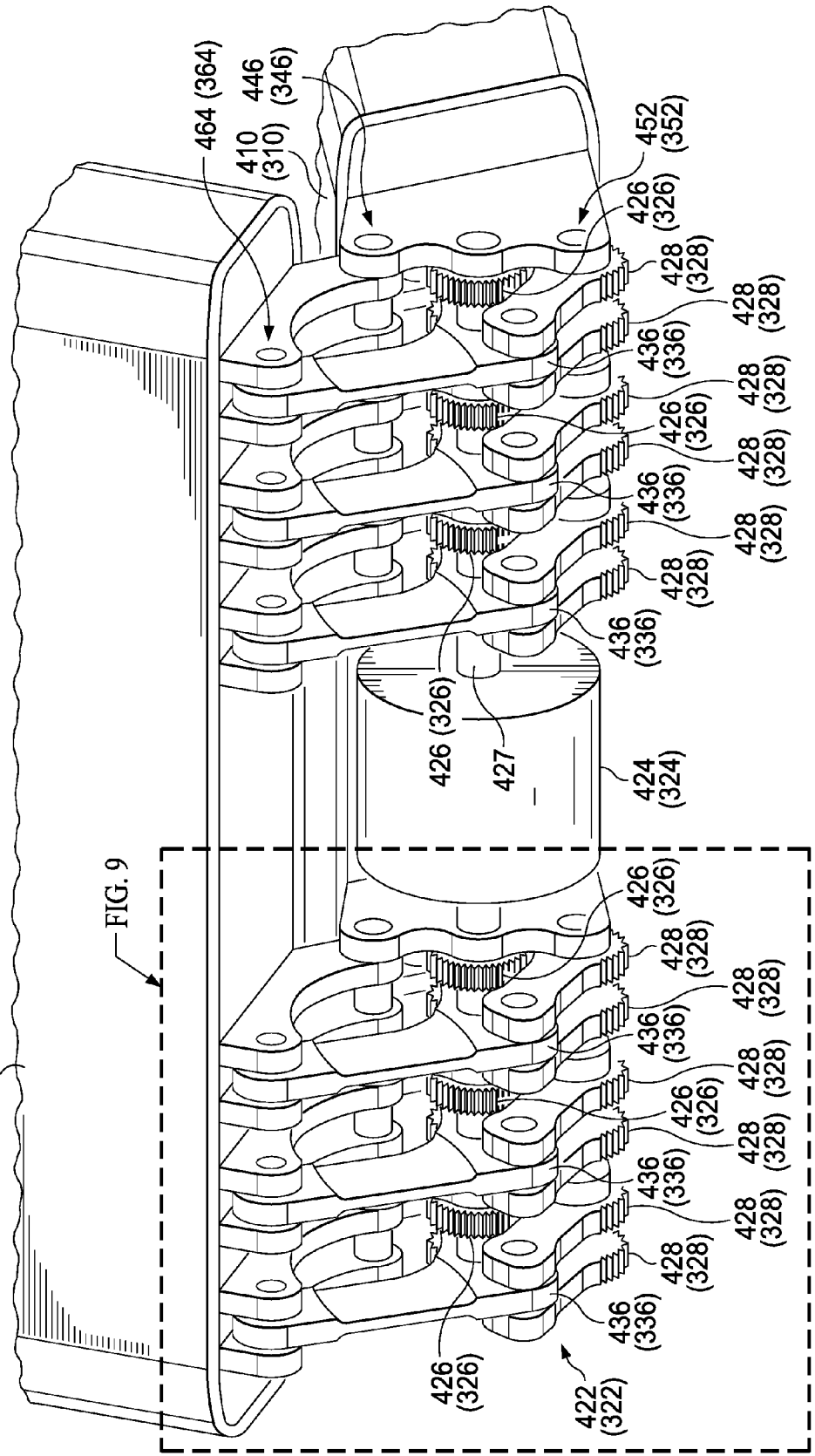
FIG. 8 is an isometric end view diagram of a wing fold system in a folded position in accordance with an illustrative embodiment.

FIG. 5 is a side view diagram of a wing fold system in a flight position in accordance with an illustrative embodiment; FIG. 6 is a side view diagram of a wing fold system transitioning between a flight position and a folded position in accordance with an illustrative embodiment; FIG. 7 is a side view diagram of a wing fold system in a folded position in accordance with an illustrative embodiment; and FIG. 8 is an isometric end view diagram of a wing fold system in a folded position in accordance with an illustrative embodiment. More specifically, FIGS. 5 through 8 depict side view diagrams of wing fold system 422 without fairings 406 and 408 and without other details so as to depict certain aspects of wing fold system 422. FIG. 6 depicts a side view diagram of wing fold system 422 transitioning between flight position 301 and folded position 303.

Figure 9:
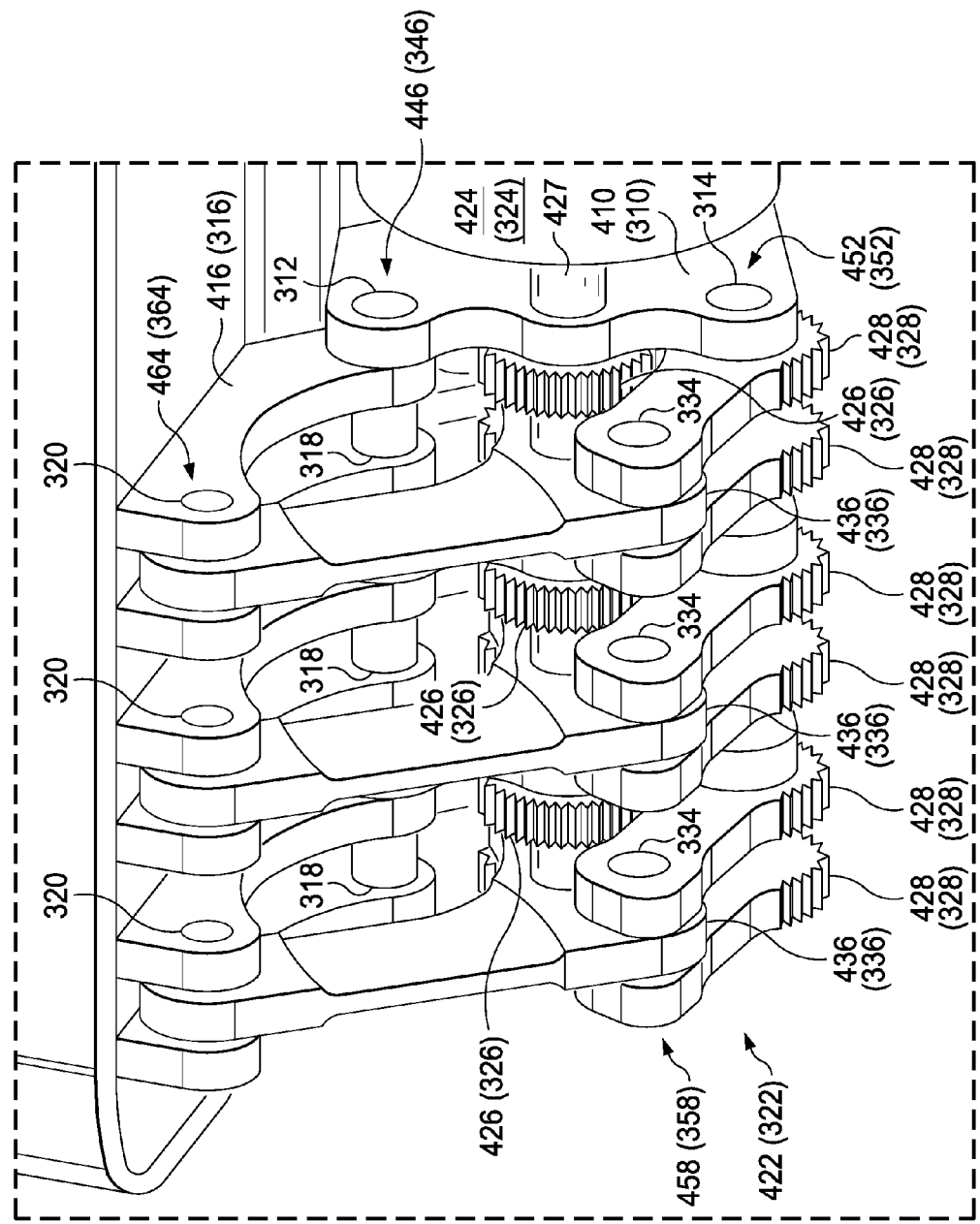
FIG. 9 is an isometric end view diagram of a wing fold system in a folded position in accordance with an illustrative embodiment.

FIG. 9 is an isometric end view diagram of a wing fold system in a folded position in accordance with an illustrative embodiment. More specifically, FIGS. 7 through 9 depict diagrams of wing fold system 422 in folded position 303. As a convenience, to assist the reader in correlating elements shown in embodiments illustrated in FIGS. 4-9 with their associated elements first introduced in block diagram in FIG. 3, where helpful, elements introduced with 3xx item numbers in FIG. 3, and then also given 4xx item numbers in FIGS. 4-5, are shown in FIGS. 7-9 with the 3xx number in parenthesis along with the 4xx item number for the correlated element. FIGS. 8 and 9 depict an isometric end view and show how multiple links and joints of wing fold system 422 can be arranged. Flight position 301 depicted in FIGS. 4 and 5 corresponds to that of FIG. 1 and folded position 303 depicted in FIG. 7 through FIG. 9 correspond to that of FIG. 2. Wing fold system 422 of FIG. 4 through FIG. 9 may include fairings 406, 408, and 418, fixed portion 410, unfixed portion 416, toothed member 426, first link 428, second link 436, first joint 446, second joint 452, third joint 458, fourth joint 464, latch 472, and sensor 474.

Fairings 406, 408, and 418 may surround wing fold system 422 when wing fold system 422 is in flight position 301, as depicted in FIGS. 1, 4, and 5. Fairings 406, 408, and 418 may reduce the drag that would be caused by wing fold system 422 if it were exposed to air flowing across wing 300. Fairings 406, 408, and 418 may move in response to wing fold system 422 transitioning between flight position 301 and folded position 303 shown in block form in FIG. 3.

In some embodiments, fairing 418 may be formed with lower blister 420, which is located on the underside of wing 300 toward a trailing edge of wing 300, which may protrude below an extended planar level from a bottom side of fixed portion 410, to accommodate mechanisms of wing fold system 422 as a distance between a top and a bottom of wing 300 decreases toward the trailing edge of wing 300. The potential increase in drag and thus fuel consumption due to lower blister 420 on fairing 418 underneath wing 300 is overcome by fuel savings generated by the lower weight of wing fold system 422 as compared to other known current designs and materials used for folding wing mechanisms, and as compared to not extending the wingspan with unfixed portion 416.

Fixed portion 410 may be an example of a side view, looking from the tail section 112 forward, of a physical embodiment of fixed portion 126 (or inversely, 124 looking back toward the tail section 112) of FIGS. 1 and 2 and of first portion 310 shown in block form in FIG. 3. Fixed portion 410 may include a wing box.

Unfixed portion 416 may be an example of a physical embodiment of unfixed portion 122 (or inversely, 120 looking backward toward tail section 112) of FIGS. 1 and 2 and of second portion 316 shown in block form in FIG. 3. In this illustrative example, unfixed portion 416 may include a wingtip and may rotate about first joint 446 with respect to fixed portion 410.

Toothed member 426 may be an example of a physical embodiment of toothed member 326 shown in block form in FIG. 3. Rotation of toothed member 426 may cause rotation of first link 428 about second joint 452 with respect to fixed portion 410.

First link 428 may be an example of a physical embodiment of first link 328 shown in block form in FIG. 3. First link 428 may rotate about second joint 452 in response to rotation of toothed member 426 and may transfer its movement to second link 436. First link 428 may transfer its movement to second link 436 via third joint 458 to drive wing fold system 422 to folded position 303 and compress wing fold system 422 to flight position 301 shown in block form in FIG. 3.

Second link 436 may be an example of a physical embodiment of second link 336 shown in block form in FIG. 3. Second link 436 may be moved by the rotation of first link 428 via third joint 458, which may push on unfixed portion 416 via fourth joint 464. When wing 300 and wing fold system 422 are in flight position 301, as shown in FIG. 5, aerodynamic lift forces on unfixed portion 416 may create a force that may pull fourth joint 464 away from third joint 458. The force on second link 436, which may pull fourth joint 464 away from third joint 458, may put a tension force on second link 436.

The force pulling third joint 458 acting along the line to fourth joint 464, may act as a feature that may assist in keeping wing 300 in flight position 301, shown in block form in FIG. 3, when aerodynamic lift forces act on unfixed portion 416, as may occur during flight. When wing fold system 422 is in flight position 301 as shown in FIG. 5, the tension force on third joint 458 may act along a line from third joint 458 to fourth joint 464, which may align above the center point of second joint 452 and may act as an over center locking feature. Because third joint 458 is connected to first link 428 which is connected to fixed portion 410 at second joint 452, motion of third joint 458 along the line from third joint 458 to fourth joint 464 may be restricted by second joint 452 being connected to fixed portion 410, and an upward force may result on first link 428 at third joint 458. The upward force on first link 428 may be restrained by teeth 430 engagement with toothed member 426. If teeth 430 and toothed member 426 were not engaged, such as if teeth were stripped, the upward force on first link 428 may be restrained by physical contact of first link 428 with stop 429. Stop 429 may be connected to fixed portion 410.

Toothed member 426 may be an example of a physical embodiment of toothed member 326 shown in block form in FIG. 3. Toothed member 426 may comprise a group of pinions connected with each other via torque tube 427 that may be connected to link actuator 424. Movement of toothed member 426 may cause rotation of first link 428 about second joint 452 with respect to fixed portion 410. Movement of first link 428 may be physically blocked by stop 429. Stop 429 may be connected to fixed portion 410. Contact or proximity of first link 428 to stop 429 may signal toothed member 426 to stop rotating.

The positioning of joints and links in wing fold system 422 relative to each other, may result in an over center locking feature in wing fold system 422 that may be inherent. The over center locking feature may inhibit wing 300 from moving out of flight position 301 while in flight. The over center locking feature may eliminate a need for additional, and weighty, locking features in wing fold system 422. Thus, wing fold system 422 may provide inherent design features that may overcome a need for weighty locking features and/or the need for hydraulic or electrical control systems for the locking features. Eliminating a need for some or all of the locking features and related controls commonly used in current folding wings may increase aircraft fuel efficiency over currently existing folding wing designs.

The force pulling third joint 458 toward fourth joint 464 may generate a force pulling third joint 458 toward second joint 452. The force pulling third joint 458 toward second joint 452 may act to produce a compressive force on first link 428 that may act along a line from the center point of third joint 458 to the center point of second joint 452. The compressive forces on first link 428 may provide a feature that may inhibit shear failure of first link 428 while wing fold system 422 is in flight position 301 as shown in FIG. 5. If any cracks were to occur in first link 428, the compressive forces on first link 428 would resist propagation or separation of the cracks.

Second link 436 and first link 428 may be configured to comply with Federal Aviation Regulations that may require second link 436 to be able to withstand a certification tension force, and first link 428 to be able to withstand a certification compressive force, that can support a maximum certified positive "g" load force on the aircraft while wing 300 produces lift required for a maximum certified takeoff weight multiplied by a safety factor, without failure of the first link 428 or second link 436. Maximum certified positive "g" forces may be 2.5. The safety factor may be 1.5.

When wing 300 and wing fold system 422 are in flight position 301, as shown in FIG. 5, gravity and negative aerodynamic lift forces on unfixed portion 416 may create a force that may push fourth joint 464 toward third joint 458. Thus, second link 436 may experience compressive forces. The force that may push fourth joint 464 toward third joint 458, may generate a force that may pull third joint 458 away from second joint 452, and results in tension forces on first link 428. Stop 429 may resist forces on third joint 458 and first link 428 from moving upward beyond the position shown for third joint 458 and first link 428 in FIG. 5.

Second link 436 and first link 428 may be configured to comply with Federal Aviation Regulations that may require second link 436 to be able to withstand a certification compressive force, and first link 428 to be able to withstand a certification tension force, that can support a maximum certified negative "g" load force on the aircraft for a maximum certified takeoff weight multiplied by a safety factor, without failure of the first link 428 or second link 436. Maximum certified negative "g" forces may be 1.0. The safety factor may be 1.5.

First joint 446 may connect fixed portion 410 and unfixed portion 416. Second joint 452 may connect fixed portion 410 and first link 428. Third joint 458 may connect first link 428 and second link 436. Fourth joint 464 may connect second link 436 and unfixed portion 416.

Latch 472 may engage lock sector 438 of second link 436 when the wing fold system is in flight position 301. Second link 436 may not rotate, and unfixed portion 416 may not move from flight position 301 while latch 472 is engaged with lock sector 438 of second link 436.

Sensor 474 may sense a position of latch 472. Sensor 474 may indicate that wing 300 may be in flight position 301 and that wing fold system 422 may be ready for flight. Latch 472 being in a position that corresponds to being engaged with lock sector 438 may indicate that wing 300 may be in flight position 301 and thus that wing fold system 422 may be ready for flight. Latch 472 not being in a position that corresponds to being engaged with lock sector 438 may indicate that wing 300 may not be in flight position 301 and wing fold system 422 may not be ready for flight. Sensor 474 may sense position of latch 472 by any method known in the art, which may include but is not limited to, mechanically, magnetically, optically, or electronically.

Sensor 475 may sense a position of second link 436. Sensor 475 may indicate that second link 436 and wing 300 may be in flight position 301 and that wing fold system 422 may be ready for flight. Second link 436 being in a position that corresponds to lock sector 438 being engaged with latch 472 may indicate that wing 300 may be in flight position 301 and thus that wing fold system 422 may be ready for flight. Second link 436 not being in a position that corresponds to its lock sector 438 being engaged with latch 472 may indicate that wing 300 may not be in flight position 301 and thus that wing fold system 422 may not be ready for flight. Sensor 475 may sense position of second link 436 by any method known in the art, which may include but is not limited to, mechanically, magnetically, optically, or electronically. Second link 436 may have a coating or include a material that is sensed by sensor 475.

Sensor 475 may signal actuator 476 to move latch 472 to engage lock sector 438 from a position shown in FIG. 6 for latch 472 to the position shown in FIG. 5 for latch 472. Actuator 476 may be driven electrically, or by other suitable means, such as but not limited to hydraulically or pneumatically.

With reference to FIGS. 8 and 9, a diagram of a wing fold system in a folded position is depicted in accordance with an illustrative embodiment. FIGS. 8 and 9 depict an isometric end view and show how multiple links and joints may be arranged.

With reference to FIG. 8, wing fold system 422 may include fixed portion 410, unfixed portion 416, link actuator 424, and a plurality of: toothed member 426, first link 428, and second link 436.

Fixed portion 410 may be an example of a physical embodiment of fixed portion 124 of FIGS. 1 and 2 and of first portion 310 shown in block form in FIG. 3. Fixed portion 410 may include a wing box.

Unfixed portion 416 may be an example of a physical embodiment of unfixed portion 122 of FIGS. 1 and 2 and of second portion 316 shown in block form in FIG. 3. Unfixed portion 416 may include a wingtip and may rotate about first joint 446 with respect to fixed portion 410.

Link actuator 424 may be an example of a physical embodiment of link actuator 324 shown in block form in FIG. 3. Link actuator 424 may be juxtaposed between two sets of multiple links and joints that make up wing fold system 422 as depicted in FIG. 5.

With reference to FIG. 9, FIG. 9 is an isometric end view diagram of a wing fold system in a folded position in accordance with an illustrative embodiment. FIG. 9 shows a zoom in on one half of wing fold system 422 shown in FIG. 8. FIG. 9, differs by showing an optional configuration of a lesser quantity of toothed member 426 that are connected to torque tube 427. Instead of a quantity of three toothed member 426 on each side of link actuator 424, there may be only a single toothed member 426 connected to torque tube 427 on each side of link actuator 424. Reducing the quantity of toothed member 426 that may be on each side of link actuator 424 from a greater number down to just one toothed member 426 that may be on each side of link actuator 424 may reduce the overall weight of wing fold system 422. Reducing the overall weight of wing fold system 422 may allow reduction in strengthening components of fixed portion 410, which may reduce the weight of those components, and may improve the fuel efficiency of aircraft 100 of FIG. 1.

A plurality of first link 428 may each be an example of a physical embodiment of first link 328 shown in block form in FIG. 3. The plurality of first link 428 may rotate about a corresponding plurality of second joint 452 in response to movement of toothed member 426 and may transfer movement to a corresponding plurality of second link 436 via a corresponding plurality of third joint 458 to drive the wing fold system to folded position 303 and compress the wing fold system to flight position 301. The wing fold system may comprise two first links 428 for each second link 436, as shown.

A plurality of second link 436 may each be an example of a physical embodiment of second link 336 shown in block form in FIG. 3. The plurality of second link 436 may be moved by the rotation of the plurality of corresponding first link 428 via the corresponding plurality of third joint 458 to push unfixed portion 416 via a plurality of corresponding fourth joint 464. The plurality of second link 436 may allow for tension and load to remain on links and joints of wing fold system 422 while in flight position 301 and in folded position 303.

Figure 10:
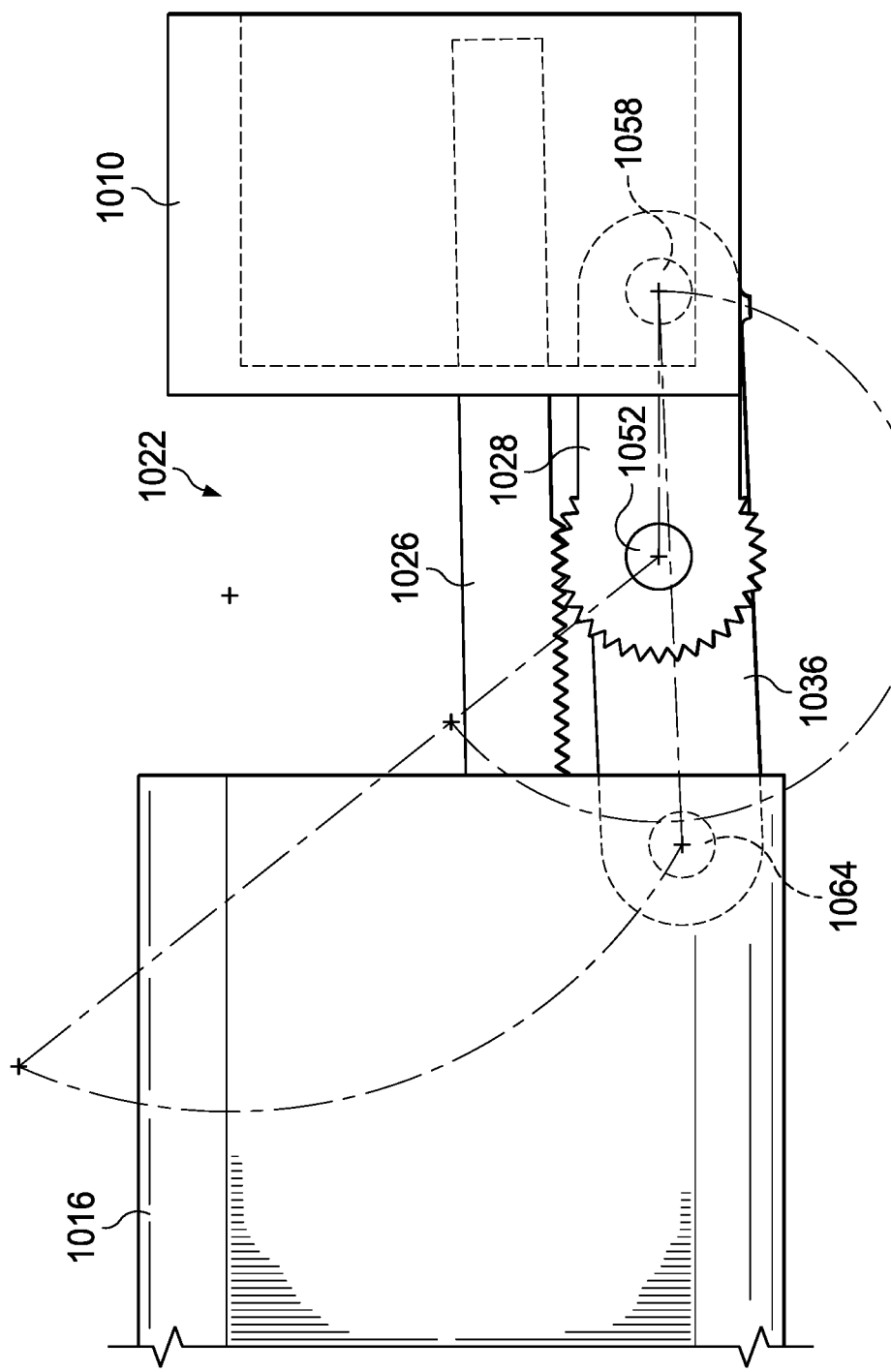
FIG. 10 is a diagram of a wing fold system in a flight position in accordance with an illustrative embodiment.
Figure 11:
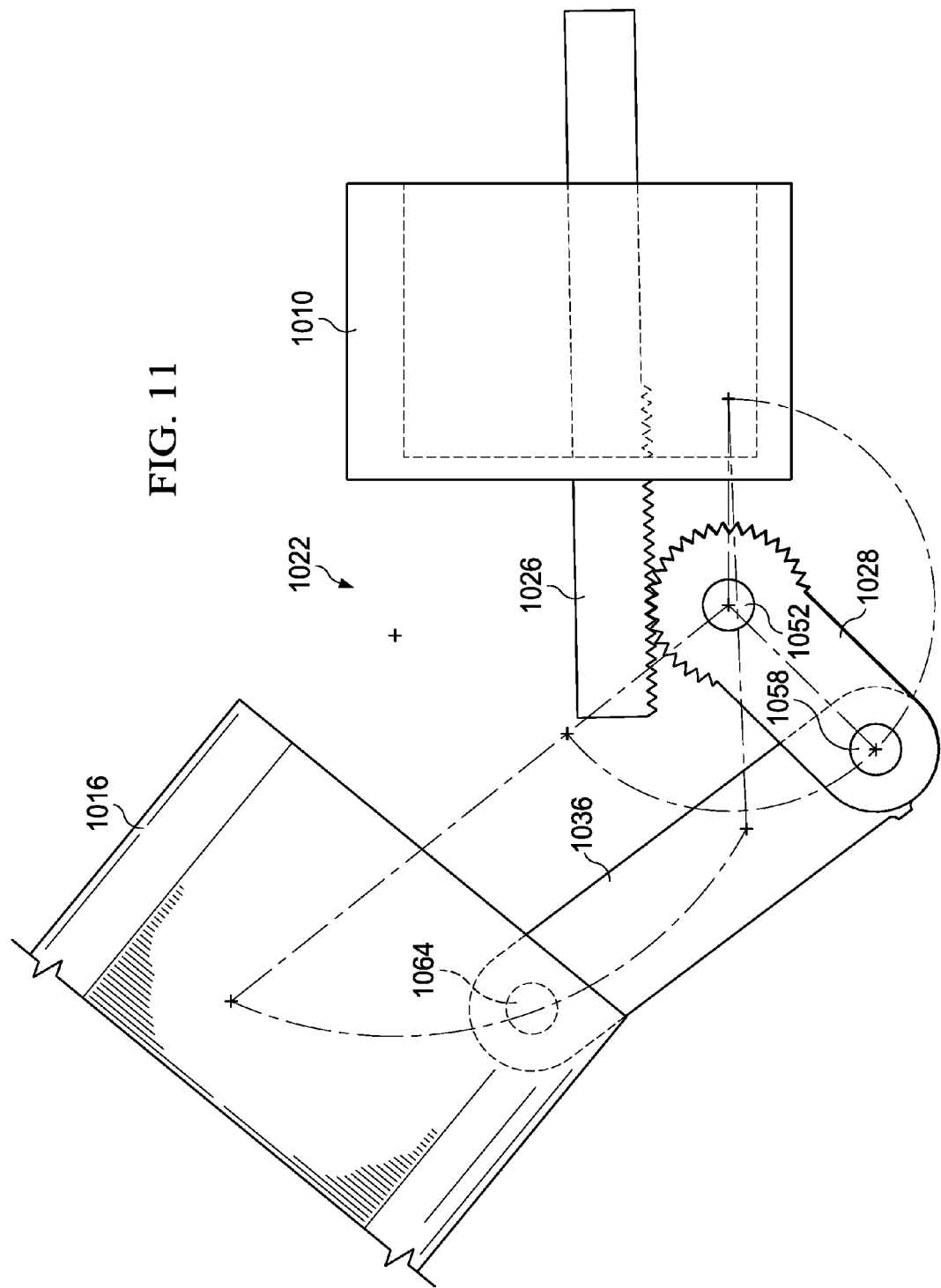
FIG. 11 is a diagram of a wing fold system transitioning between a flight position and a folded position in accordance with an illustrative embodiment.
Figure 12:
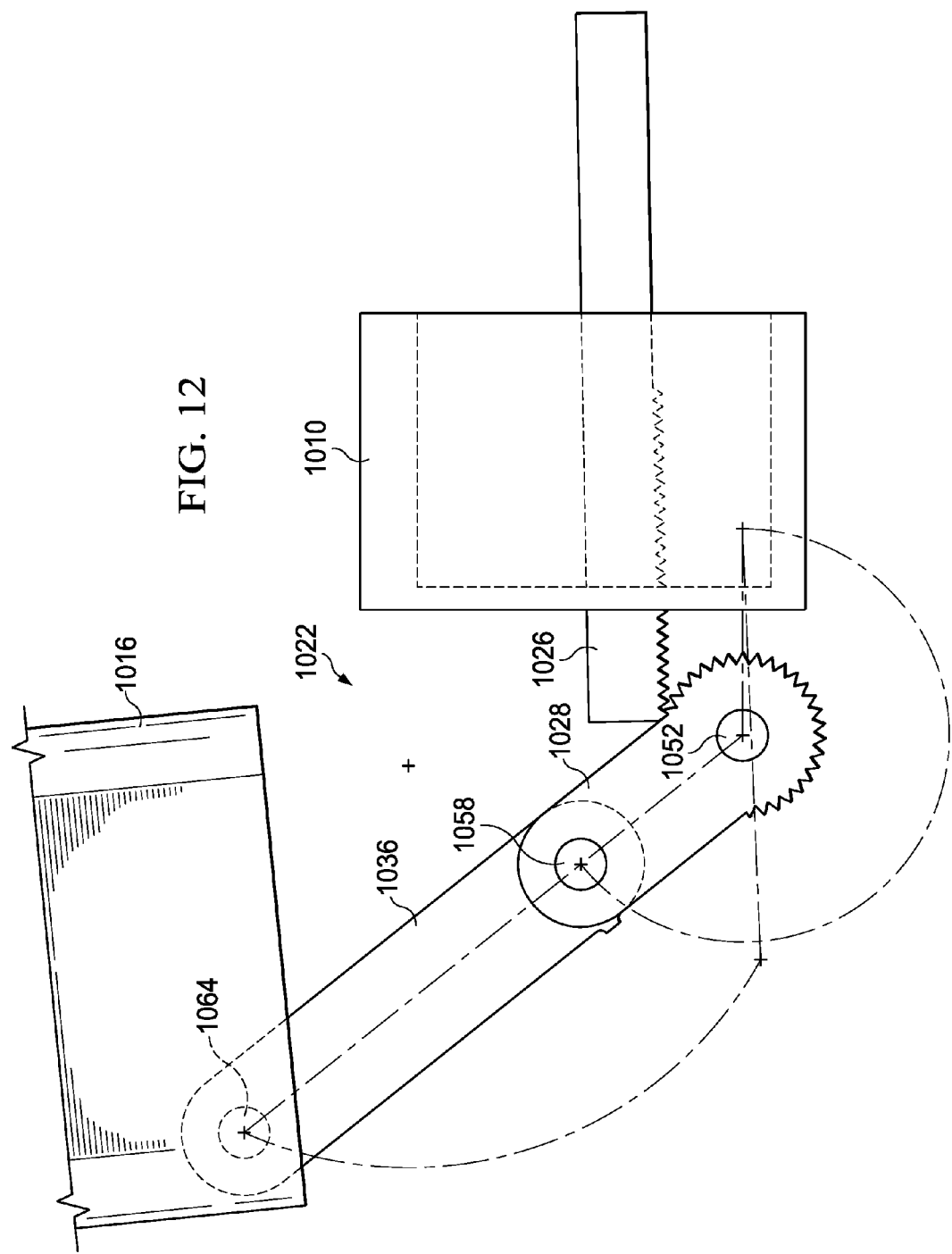
FIG. 12 is a diagram of a wing fold system in a folded position in accordance with an illustrative embodiment.

With reference to FIGS. 10 through 12, illustrations of a wing fold system are depicted in accordance with an illustrative embodiment. Wing fold system 1022 may be used by aircraft 100 of FIGS. 1 and 2 and embody wing fold system 322 shown in block form in FIG. 3.

FIG. 10 is a diagram of a wing fold system in a flight position in accordance with an illustrative embodiment; FIG. 11 is a diagram of a wing fold system transitioning between a flight position and a folded position in accordance with an illustrative embodiment; and FIG. 12 is a diagram of a wing fold system in a folded position in accordance with an illustrative embodiment. More specifically, FIGS. 10 through 12 depict diagrams of wing fold system 1022 without fairings, such as fairings 406, 408, and 418 of FIG. 4, and without other details so as to depict certain aspects of wing fold system 1022. FIG. 10 is a diagram of a wing fold system in a flight position in accordance with an illustrative embodiment.

FIG. 11 is a diagram of a wing fold system transitioning between a flight position and a folded position in accordance with an illustrative embodiment. FIG. 12 is a diagram of a wing fold system in a folded position in accordance with an illustrative embodiment. Flight position 301, shown in block form in FIG. 3, may be depicted by FIG. 10 and may correspond to FIG. 1. Folded position 303 may be depicted by FIG. 12 and may correspond to that of FIG. 2.

The wing fold system of FIGS. 10 through 12 may include fixed portion 1010, unfixed portion 1016, toothed rack 1026, first link 1028, and second link 1036.

Fixed portion 1010 may be an example of a side view, looking from the tail section 112 forward, of a physical embodiment of fixed portion 126 (or inversely, 124 looking back toward the tail section 112) of FIGS. 1 and 2 and of first portion 310 shown in block form in FIG. 3. Fixed portion 1010 may include a wing box.

Unfixed portion 1016 may be an example of a side view, looking from tail section 112, physical embodiment of unfixed portion 122 (or inversely, 120 looking back toward tail section 112) of FIGS. 1 and 2 and of second portion 316 shown in block form in FIG. 3. Unfixed portion 1016 may include a wingtip and may rotate about a first joint with respect to fixed portion 1010.

Toothed rack 1026 may be an example of a physical embodiment of toothed member 326 shown in block form in FIG. 3. Movement of toothed rack 1026 may cause rotation of first link 1028 about second joint 1052 with respect to fixed portion 1010.

First link 1028 may be an example of a physical embodiment of first link 328 shown in block form in FIG. 3. First link 1028 may rotate about second joint 1052 in response to movement of toothed rack 1026. First link 1028 may transfer its movement to second link 1036. First link 1028 may transfer its movement to second link 1036 via third joint 1058 to drive wing fold system 1022 to folded position 303 and compress wing fold system 1022 to flight position 301 shown in block form in FIG. 3.

Second link 1036 may be an example of a physical embodiment of second link 336 shown in block form in FIG. 3. The second link 1036 may be moved by the rotation of first link 1028 via third joint 1058. Second link 1036 may push unfixed portion 1016 via fourth joint 1064. Second link 1036 may allow for tension and load to remain on links and joints of wing fold system 1022 while in flight position 301.

Second joint 1052 may connect fixed portion 1010 and first link 1028. Third joint 1058 may connect first link 1028 and second link 1036. Fourth joint 1064 may connect second link 1036 and unfixed portion 1016.

The different components shown in FIGS. 1, 2, and 4 through 12 may be combined with components in FIG. 3, used with components in FIG. 3, or a combination of the two. Additionally, some of the components in FIGS. 4 through 12 may be illustrative examples of how components shown in block form in FIG. 3 can be implemented as physical structures.

Figure 13:
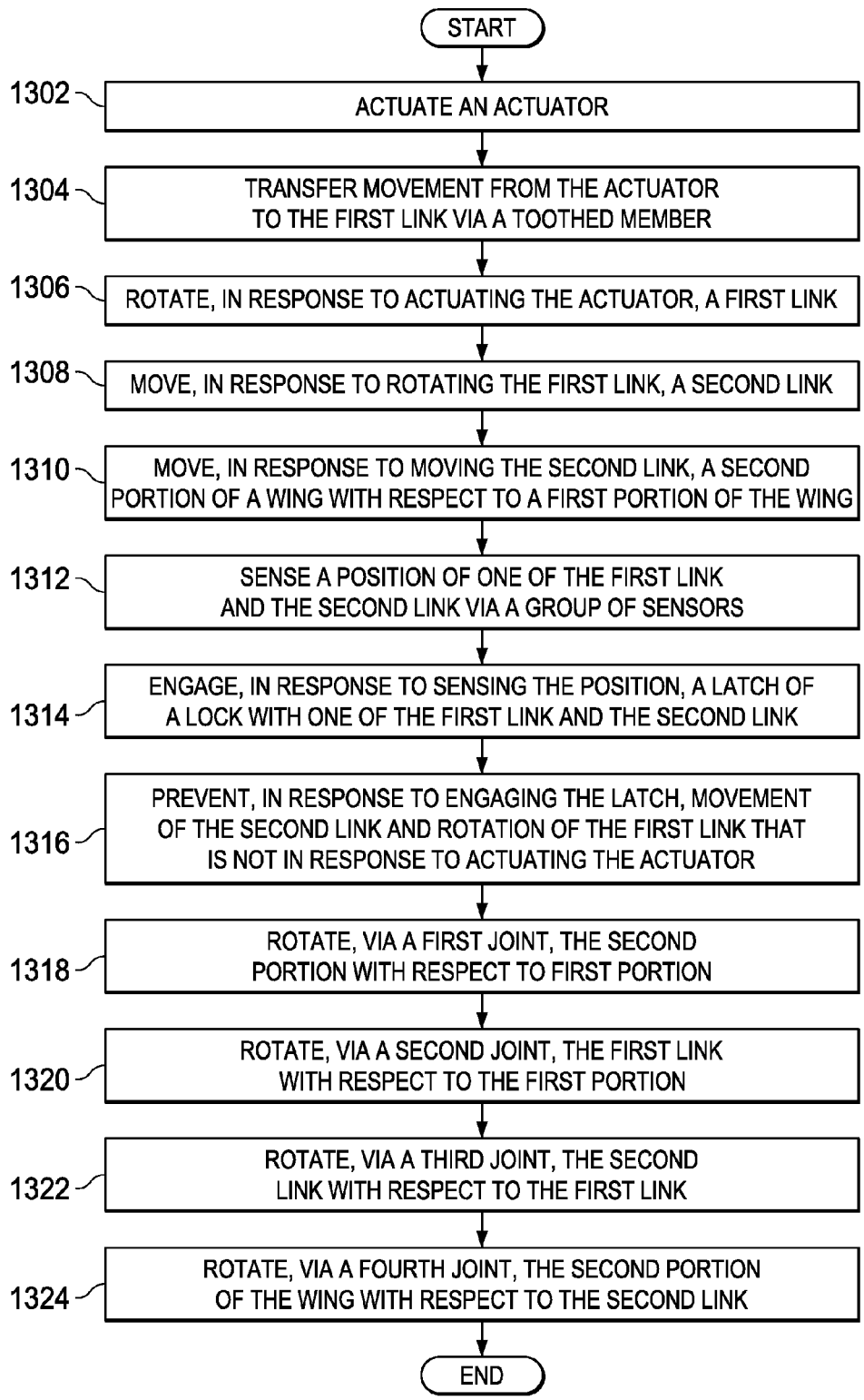
FIG. 13 is a flow diagram of a method of a wing fold system in accordance with an illustrative embodiment.

With reference to FIG. 13, FIG. 13 is a flow diagram of a method of a wing fold system in accordance with an illustrative embodiment. The process illustrated in FIG. 13 may be implemented in wing 300 in FIG. 3.

The method may begin with operation 1302. In operation 1302, an actuator may actuate. The actuating may be a rotational or linear movement.

In operation 1304, a toothed member may transfer movement from the actuator to a first link. The toothed member may be embodied as a pinion or a toothed rack.

In operation 1306, the first link may rotate in response to actuating the actuator in operation 1302. The first link may connect a second link and a first portion of a wing.

In operation 1308, the second link may move in response to rotating of the first link in operation 1306. The second link may connect the first link and a second portion of the wing.

In operation 1310, the second portion of a wing may move in response to moving of the second link in operation 1308. The second portion also may move with respect to the first portion of the wing.

One of the first portion and the second portion may be a fixed portion of the wing and the other of the first portion and the second portion may be an unfixed portion of a wing. The unfixed portion may be a tip of the wing. The wingtip may be formed without moveable control surfaces of the wing and the fixed portion may include a wing box.

In operation 1312, a group of sensors may sense a position of one of the first link and the second link. The group of sensors may also sense the position of a lock. The sensing may be electrical, optical, mechanical, or another method as may be applicable.

In operation 1314, a latch of the lock may engage with one of the first link and the second link in response to sensing of the position in operation 1312. The engagement of the latch may be via an actuator for the latch.

In operation 1316, movement of the second link and rotation of the first link that may not be in response to the actuating of the actuator in operation 1302 may be prevented in response to engaging the latch in operation 1316. The latch may engage a lock sector of the second link, which may provide for preventing the movement.

In operation 1318, a first joint may rotate the second portion with respect to the first portion. The first joint may include a first joint element of the first portion and a third joint element of the second portion. Rotation of the first joint may be enhanced by lubrication or the use of bearings within the joint.

In operation 1320, a second joint may rotate the first link with respect to the first portion. The second joint may include a second joint element of the first portion and a fifth joint element of the first link. Rotation of the second joint may be enhanced by lubrication or the use of bearings within the joint.

In operation 1322, a third joint may rotate the second link with respect to the first link. The third joint may include a sixth joint element of the first link and an eighth joint element of the second link. Rotation of the third joint may be enhanced by lubrication or the use of bearings within the joint.

In operation 1324, a fourth joint may rotate the second portion with respect to the second link. The fourth joint may include a fourth joint element of the second portion and a seventh joint element of the second link. Rotation of the fourth joint may be enhanced by lubrication or the use of bearings within the joint.

Illustrative embodiments of the disclosure may be described in the context of aircraft manufacturing and service method 1400 as shown in FIG. 14 and aircraft 1500 as shown in FIG. 15. Turning first to FIG. 14, FIG. 14 is an illustration of an aircraft manufacturing and service method in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 may take place. Thereafter, aircraft 1500 in FIG. 15 may go through certification and delivery 1410 in order to be placed in service 1412. While in service 1412, aircraft 1500 in FIG. 15 may be scheduled for routine maintenance and service 1414, which may include modification, reconfiguration, refurbishment, and other maintenance or servicing.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, FIG. 15 is an illustration of an aircraft in which an illustrative embodiment may be implemented. In this example, aircraft 1500 may be produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example may be shown, different illustrative embodiments may be applied to other industries, such as the automotive industry.

Apparatuses and methods embodied herein may be employed during at least one of the stages of aircraft manufacturing and service method 1400 in FIG. 14.

In one illustrative example, components or subassemblies produced in component and subassembly manufacturing 1406 in FIG. 14 may be fabricated or manufactured in a manner similar to components or subassemblies produced while aircraft 1500 may be in service 1412 in FIG. 14. As yet another example, one or more apparatus embodiments, method embodiments, or a combination thereof may be utilized during production stages, such as component and subassembly manufacturing 1406 and system integration 1408 in FIG. 14. One or more apparatus embodiments, method embodiments, or a combination thereof may be utilized while aircraft 1500 may be in service 1412 and/or during maintenance and service 1414 in FIG. 14. The use of a number of the different illustrative embodiments may substantially expedite the assembly of and/or may reduce the cost of aircraft 1500.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and may be not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected may be chosen and described in order to best explain the principles of the embodiments, the practical application, and to enable others of ordinary skill in the art to understand the disclosure for various embodiments with various modifications as may be suited to the particular use contemplated.

What is claimed is:

1. A method of folding a wing, the method comprising:
    connecting a first opening in a first fixed portion of a wing to a first opening in an unfixed portion of a wing at a first joint;
    aligning a first opening in a first link to a second opening in the fixed portion at a second joint, the second joint being located in the fixed portion and distinct from the unfixed portion;
    actuating a link actuator that engages the first link and causes the first link to rotate concentrically about the first opening of the first link and the second joint;
    connecting the first link to a second link via aligning a second opening of the first link with a first opening in the second link at a third joint located distinct from both the fixed portion and the unfixed portion;
    aligning and connecting a second opening in the second link to a second opening in the unfixed portion at a fourth joint, such that rotating the first link concentrically about the first opening of the first link and the second joint causes rotating the second link about a fourth joint and thereby moving the unfixed portion of the wing with respect to the fixed portion of the wing via rotating the unfixed portion of the wing concentrically about the first joint and the first opening of the unfixed portion; said method further comprising sensing a position of one of the first link and the second link via a group of sensors; and
    a link actuator driving a torque tube having at least one toothed member, the toothed member fitting with teeth engaging the first link and causing the third joint to rotate about the second joint located in the first fixed portion of the wing,
    the toothed member being located between the first joint and the second joint.

2. The method of claim 1, further comprising:
    the unfixed portion configured as a wingtip without moveable control surfaces of the wing; and
    the fixed portion comprising a wing box.

3. The method of claim 1 further comprising:
    engaging a latch of a lock, in response to the sensing of the position, with one of the first link and the second link; and
    preventing moving of the second link in response to the engaging of the latch.

4. The method of claim 3, wherein the latch engages a lock sector of the second link.

5. The method of claim 1 further comprising:
    transferring movement from the link actuator to the first link via a toothed member.

6. The method of claim 1, the moving of the unfixed portion of the wing comprising:
    rotating, via the first joint, the unfixed portion with respect to the fixed portion, the first joint comprising:
        a first joint element of the fixed portion of the wing comprising the first opening in the fixed portion; and
        a third joint element of the unfixed portion of the wing comprising the first opening in the unfixed portion.

7. The method of claim 1, the rotating of the first link comprising:
    rotating, via the second joint, the first link with respect to the fixed portion, the second joint comprising:
        a second joint element of the fixed portion of the wing comprising the second opening in the fixed portion; and
        a fifth joint element of the first link comprising the first opening in the first link.

8. The method of claim 1, the moving of the second link comprising:
- rotating, via the third joint, the second link with respect to the first link, the third joint comprising:
  - a sixth joint element of the first link comprising the second opening in the first link; and
  - an eighth joint element of the second link comprising the first opening in the second link.

9. The method of claim 1, the moving of the unfixed portion of the wing comprising:
- rotating, via the fourth joint, the unfixed portion of the wing with respect to the second link, the fourth joint comprising:
  - a fourth joint element of the second unfixed portion of the wing comprising the second opening in the unfixed portion; and
  - a seventh joint element of the second link comprising the second opening in the second link.

10. An apparatus of a wing fold system, the apparatus comprising:
- a first opening in a fixed portion of a wing connected to a first opening in an unfixed portion of a wing via a first joint;
- a second opening in the fixed portion connected to a first opening in a first link via a second joint located distinct from the unfixed portion;
- a second opening in the first link connected to a first opening in a second link via a third joint located distinct from the fixed portion and the unfixed portion;
- a second opening in the second link connected to a second opening in the unfixed portion of a wing via a fourth joint distinct from the fixed portion;
- a link actuator located between the first opening in the fixed portion and the second opening in the fixed portion configured such that in operation, the link actuator rotates the first link concentrically about the first opening of the first link and about the second joint and moves the second link via a movement of the third joint such that a movement of the second link rotates about the first joint, the unfixed portion of the wing with respect to the fixed portion of the wing via a movement of the fourth joint; said apparatus further comprising:
- a group of sensors configured to sense a position of one of the first link and the second link; and
- the link actuator driving a torque tube having at least one toothed member, the toothed member fitting with teeth of the first link, such that in operation, a rotation of the first link causes the third joint to rotate about the second joint located in the first fixed portion of the wing, the toothed member being located between the first joint and the second joint.

11. The apparatus of claim 10, further comprising:
- the unfixed portion of the wing configured as a wingtip without moveable control surfaces of the wing; and
- the fixed portion comprising a wing box.

12. The apparatus of claim 10 further comprising:
- the toothed member configured to transfer movement from the link actuator to the first link.

13. The apparatus of claim 10 further comprising:
- the first joint configured to rotate the unfixed portion with respect to the fixed portion, the first joint comprising:
  - a first joint element comprising a first opening of the fixed portion of the wing; and
  - a third joint element comprising a first opening of the unfixed portion of the wing.

14. The apparatus of claim 10 further comprising:
- the second joint configured to rotate the first link with respect to the fixed portion, the second joint comprising:
  - a second joint element comprising a second opening of the fixed portion of the wing; and
  - a fifth joint element comprising a first opening of the first link.

15. The apparatus of claim 10 further comprising:
- the third joint configured to rotate the second link with respect to the first link, the third joint comprising:
  - a sixth joint element comprising a second opening of the first link; and
  - an eighth joint element comprising a first opening of the second link.

16. The apparatus of claim 10 further comprising:
- the fourth joint configured to rotate the unfixed portion of the wing with respect to the second link, the fourth joint comprising:
  - a fourth joint element comprising a second opening of the unfixed portion of the wing; and
  - a seventh joint element comprising a second opening of the second link.

17. The apparatus of claim 10 further comprising:
- a latch of a lock configured to engage with one of the first link and the second link in response to the sensing of the position;
- wherein the latch is configured to prevent movement of the second link and thus prevent rotation of the first link.

18. The apparatus of claim 17, further comprising the latch configured such that it prevents movement of the second link when the latch engages a lock sector of the second link.

* * * * *